(12) United States Patent
Ottleben et al.

(10) Patent No.: US 8,853,612 B2
(45) Date of Patent: Oct. 7, 2014

(54) LIGHT BARRIER

(75) Inventors: Bernd Ottleben, Bad Salzdetfurth (DE); Petra Ottleben, Bad Salzdetfurth (DE)

(73) Assignee: Pantron Instruments GmbH, Bad Salzdetfurth (DE)

( * ) Notice: Subject to any disclaimer, the term of this patent is extended or adjusted under 35 U.S.C. 154(b) by 520 days.

(21) Appl. No.: 13/141,120

(22) PCT Filed: Dec. 16, 2009

(86) PCT No.: PCT/DE2009/001774
§ 371 (c)(1), (2), (4) Date: Jun. 21, 2011

(87) PCT Pub. No.: WO2010/072200
PCT Pub. Date: Jul. 1, 2010

(65) Prior Publication Data
US 2011/0248154 A1   Oct. 13, 2011

(30) Foreign Application Priority Data
Dec. 24, 2008  (DE) .................. 10 2008 063 080

(51) Int. Cl.
*G06M 7/00* (2006.01)
*G01V 8/14* (2006.01)

(52) U.S. Cl.
CPC ....................................... *G01V 8/14* (2013.01)
USPC ........................................ 250/221; 340/555

(58) Field of Classification Search
USPC .................................. 250/221; 340/555–557
See application file for complete search history.

(56) References Cited

U.S. PATENT DOCUMENTS

| | | | |
|---|---|---|---|
| 2002/0027208 A1* | 3/2002 | Haque et al. | 250/559.36 |
| 2003/0058105 A1* | 3/2003 | Wuestefeld et al. | 340/556 |
| 2006/0207199 A1* | 9/2006 | Darnell | 52/232 |
| 2008/0143528 A1* | 6/2008 | Haberl et al. | 340/556 |
| 2009/0108185 A1* | 4/2009 | Hoersch et al. | 250/225 |

FOREIGN PATENT DOCUMENTS

| | | |
|---|---|---|
| DE | 28 05 423 | 8/1979 |
| DE | 195 33 044 | 4/1996 |
| DE | 44 39 838 | 5/1996 |
| DE | 198 58 769 | 6/2000 |
| DE | 101 46 639 | 4/2003 |
| DE | 202 20 616 | 12/2003 |
| DE | 203 17 617 | 2/2004 |
| DE | 10 2004 022 408 A1 | 12/2005 |
| DE | 20 2005 017 006 | 12/2005 |
| DE | 10 2004 022 408 B4 | 9/2006 |
| DE | 10 2005 059 859 | 6/2007 |

(Continued)

*Primary Examiner* — Francis M Legasse, Jr.
(74) *Attorney, Agent, or Firm* — Whitham Curtis Christofferson & Cook, PC (57) ABSTRACT

A light barrier having at least one transmitter (6) and at least one receiver (8) for a light beam and having a light path (1), which runs between a first side (2) and a second side (4) of a region to be monitored, can be produced flexibly and with little complexity by virtue of the transmitter (6) and of the receiver (8) being situated on the first side (2) and by virtue of the second side (4) containing an optical system (10) which picks up the primary light beam (7) emitted by the transmitter and which deflects the primary light beam (7) and returns it to the receiver (8) via the light path (1) to the first side (2) as a secondary light beam (9), which is separate from the primary light beam (7), at a distance from the primary light beam (7).

12 Claims, 10 Drawing Sheets

(56) References Cited

FOREIGN PATENT DOCUMENTS

| | | |
|---|---|---|
| DE | 10 2006 059 547 | 6/2008 |
| EP | 1 296 161 | 3/2003 |
| EP | 1 933 172 | 6/2008 |
| JP | 58-180973 | 10/1983 |
| JP | 09-021609 | 1/1997 |
| JP | 2000267810 | 9/2000 |
| JP | 2002289910 | 10/2002 |
| JP | 2008143528 | 6/2008 |

* cited by examiner

LIGHT BARRIER

FIELD OF THE INVENTION

The invention relates to a light barrier having a transmitter for a light beam and at least one associated receiver, and having a light path that runs between a first side and a second side of a region to be monitored.

BACKGROUND

Such light barriers are known in numerous embodiments. In these, they can be designed in very different sizes and meet very different aims. Thus, for example, the contour of a motor vehicle is scanned inside a car wash system with the aid of appropriately movably arranged light barriers, in order to ensure the vehicle dries as effectively as possible with the least possible outlay on air and energy. It is also known to design very small light barriers in the form of so-called fork light barriers, in the case of which the light path extends between two limbs of a housing. Such light barriers are used, for example, as edge detectors in production machines in which webbed materials are transported in an accurately positioned fashion. If a relatively large limb separation is required for such a fork light barrier, the fork light barrier is replaced by another fork light barrier whose housing has the required limb spacing and in which the supply line to the transmitter in the one limb and to the receiver in the other limb is laid in a suitable way. The use of light barriers of different size at a point of use therefore proves to be troublesome and complicated with reference to handling and stock keeping.

SUMMARY

It is the object of the invention to design a light barrier of the type mentioned at the beginning so that it can be flexibly constructed and used for different purposes.

In order to achieve this object, according to the invention a light barrier of the type mentioned at the beginning is characterized in that the transmitter and the at least one receiver are situated on the first side, and in that an optical system that picks up the primary light beam emitted by the transmitter is arranged on the second side, which deflects the primary light beam and returns it to the receiver via the light path to the first side as a secondary light beam, which is separate from the primary light beam, at a distance from the primary light beam.

The inventive light barrier therefore has a design by means of which the light beam emitted by the transmitter reaches via the light path an optical system on the other side of the region to be monitored and is deflected there such that there is returned from the second side to the first side a secondary beam that runs at a distance from the primary light beam. It is possible in this case to utilize only the secondary light beam for the light barrier function. In this case, the primary light beam at one point can run via the light path that is insensitive to interference to the light beam. For example, the primary light beam can also run inside a hose-like or tubular protective arrangement.

As an alternative hereto, it is also possible to utilize the primary light beam for the light barrier function by having the receiver detect an interruption of the primary light beam or of the secondary light beam.

In a preferred embodiment of the invention, the optical system arranged on the second side has a focusing device for the secondary light beam. A high signal intensity is provided in this way for the receiver, and so a high signal-to-noise ratio is attained for the light barrier function.

In one variant of the invention, the optical system on the second side can include an expanding device for forming an expanded secondary light beam. Light barrier monitoring can thereby be performed for a monitoring region of two-dimensional cross section, the receiver on the first side preferably having a converging lens arrangement. An interruption of only a part of the surface of the light beam then leads in the receiver to a reduction in amplitude that can be evaluated as measurement signal in the receiver.

Furthermore, the receiver in such an arrangement can be designed as a receiver sensitive in two dimensions, so that the position of the partial interruption of the widened light beam can be established in the receiver. In this case, the receiver can have a phototransistor array, for example.

The inventive arrangement generally has the advantage that the electronic components which need a power supply and, possibly, a signal line are located on the same side of the region to be monitored. In the case of a fork light barrier, these components are located in the same limb of the housing. Consequently, it is possible to avoid troublesome cable laying, particularly in the case of relatively long light paths. A particular advantage occurs owing to the fact that the arrangement of transmitter and receiver on the same side of the region to be monitored enables a compact control of the intensity of the light beam emitted by the transmitter as a function of the intensity of the light beam received by the receiver. Consequently, according to the invention this control does not require a control signal to be transmitted from the receiver to the transmitter via the light path. According to the invention, therefore, in a preferred embodiment there is arranged on the first side a control stage with the aid of which the intensity of the primary beam emitted by the transmitter can be controlled as a function of the intensity of the secondary beam received by the receiver.

The inventive light barrier further permits the optical system receiving the primary light beam, on the second side to use beam splitter arrangements to generate a plurality of secondary light beams that are preferably fed back to the first side in a fashion parallel to one another. Here, for each secondary light beam it is possible to provide a dedicated receiver on the first side. However, it is also possible to guide the different secondary light beams generated on the second side to a common receiver which either has a sufficiently large sensitive surface, or is essentially designed as a point receiver for which the secondary light beams traverse the light path obliquely relative to one another so that all secondary light beams strike the same receiver and add together optically. However, in this case information relating to the secondary light beam interrupted by an object is lost, and so the parallel arrangement of the secondary light beams and a receiver arrangement, which can detect each secondary light beam differentially, is generally preferred. The receiver therefore preferably has a plurality of receiver elements for in each case one secondary light beam.

Conversely, the present invention also enables a design having a plurality of primary light beams which are condensed on the second side to form a common secondary light beam.

The invention enables the simple design of a fork light barrier whose limb spacing is variable. Since cabling need be done only in one limb, there is no problem in adjusting the distance of the other limb telescopically, because no cables or lines need also be guided. Such a fork light barrier can be used with a plurality of secondary light barriers for differentiated monitoring, for example of the instantaneous position of the edge of a material web, and is therefore suitable, for example, for edge monitoring even of material webs of different width.

It is also conceivable to indicate that a position of the edge of the material web has been reached and, for example, to trigger an alarm when another position within the light barrier is reached by the edge of the material web.

The customary expressions "light barrier" and "light beam" are being used to explain the invention without hereby intending a restriction to the visible light. Of course, the "light beam" in the meaning of the invention can also have a wavelength outside visible light, that is to say be an infrared beam or ultraviolet beam, for example. The suitability of appropriate transmitters and receivers for the formation of a "light barrier" depends on the respective intended use and is known without more ado to the person skilled in the art.

DESCRIPTION OF THE DRAWINGS

The invention is to be explained in more detail below with the aid of exemplary embodiments illustrated in the drawing, in which.

DESCRIPTION

Figure 1:
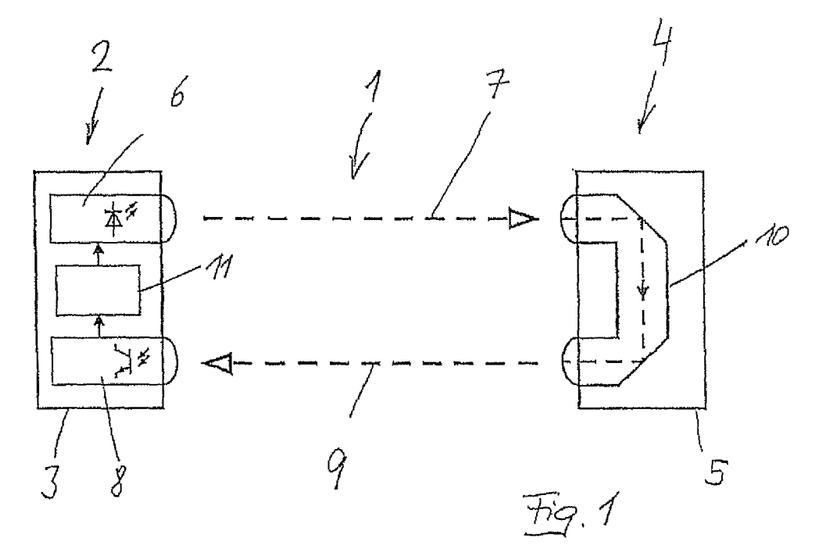
FIG. 1 is a schematic of an inventive light barrier.

FIG. 1 is a schematic of a light path 1 that runs through a region to be monitored and is limited on a first side 2 by a first part 3, and on a second side 4 by a second part 5 of a light barrier.

The first part 3 of the light barrier includes a transmitter 6 for emitting a primary light beam 7 and a receiver 8, arranged offset from the transmitter 6, for receiving a secondary light beam 9.

The second part 5 of the light barrier does not include any electronic components, but merely an optical system that serves to deflect the primary beam 7 and returns the light beam to the first part 3 of the light barrier as secondary light beam 9 at a distance from the first light beam 7. In the exemplary embodiment illustrated, the primary light beam 7 and secondary light beam 9 run parallel to one another.

Located in the first part 3 of the light barrier between the transmitter 6 and the receiver 8 is an evaluation and control stage 11 that can be used to execute the actual light barrier function by having the evaluation and control stage 11 establish whether the secondary light beam 9 has been interrupted by an object. Moreover, the evaluation and control stage 11 can further establish the intensity of the secondary light beam 9 received by the receiver 8, and set the intensity of the primary light beam 7 emitted by the transmitter 6 as a function of the established intensity of the secondary light beam 9. This prevents the evaluation of the light barrier function by the evaluation and control stage 11 from being impaired by an excessively strong or excessively weak primary light beam 7. The evaluation and control stage 11 is therefore capable of controlling the transmitter 6 so that an effectively evaluable signal of an intensity within a prescribed intensity interval arrives at the receiver 8. Furthermore, it is possible to provide on the first side 2 a switching stage (not illustrated) with the aid of which the light beam 7 from the transmitter 6 can be emitted in sections or in pulsed form. In this case, the receiver 8 or the evaluation and control stage 11 can be driven by the switching stage with the aid of appropriate switching signals, in order to receive or evaluate secondary light beams 9 only during the emitted light beams 7.

Figure 2:
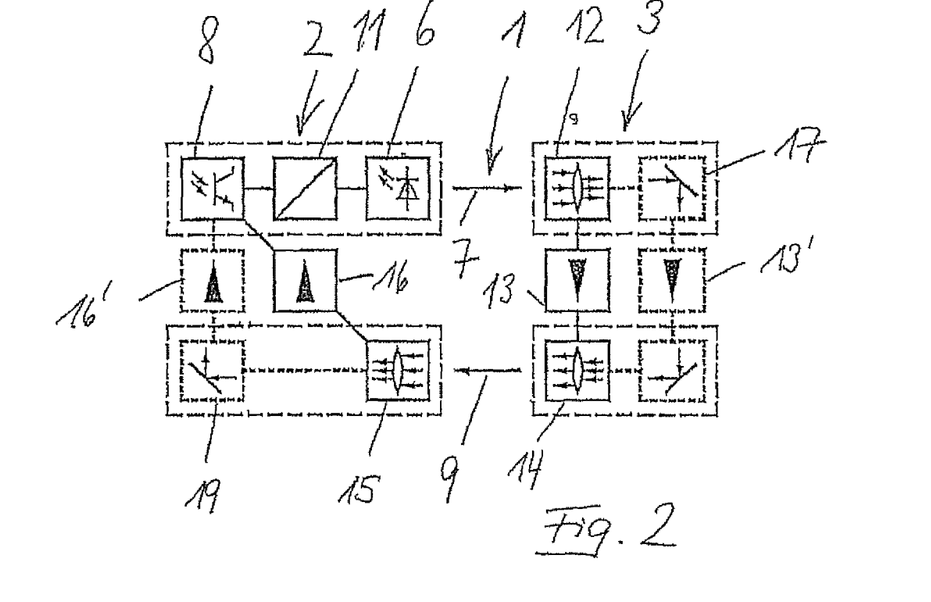
FIG. 2 is a schematic of possible arrangements on the first side and on the second side.

FIG. 2 shows a plurality of possible designs of the inventive light barrier. On the second side 3, the primary light beam 7 emitted by the transmitter 6 on the first side 2 of the light path 1 reaches a converging lens 12 with the aid of which the light is coupled into a light guide 13. The deflection of the primary light beam 7 on the second side 3 is undertaken with the aid of the light guide. Located at the output of the light guide 13 is a concave lens 14 with the aid of which the secondary light beam 9 is formed by expansion. The secondary light beam 9 strikes a converging lens 15 on the first side 2 and can, in turn, be coupled into a light guide 16 for guiding the secondary light beam 9 to the receiver 8 on the first side 2. As has already been described with the aid of FIG. 1, the evaluation and control stage 11 is arranged between the receiver 8 and the transmitter 6.

The design explained is illustrated in FIG. 2 with unbroken lines, while a conceivable alternative embodiment is depicted with stages drawn with dashes. Accordingly, the primary light beam 7 reaches a deflecting mirror 17 via the converging lens 12 on the second side 3, and can then be coupled into a light guide 13'. This light guide 13' can, if appropriate, also be omitted. Via a further deflecting mirror 18, the light beam is deflected anew by 90° and strikes the concave lens 14. In a corresponding way, after traversing the converging lens 15 the secondary light beam 9 can be guided on the first side 2 onto a deflecting mirror 19, in order to be directed onto the receiver 8. If appropriate, the light beam can be guided to the receiver 8 via a light guide 16'.

Figure 3:
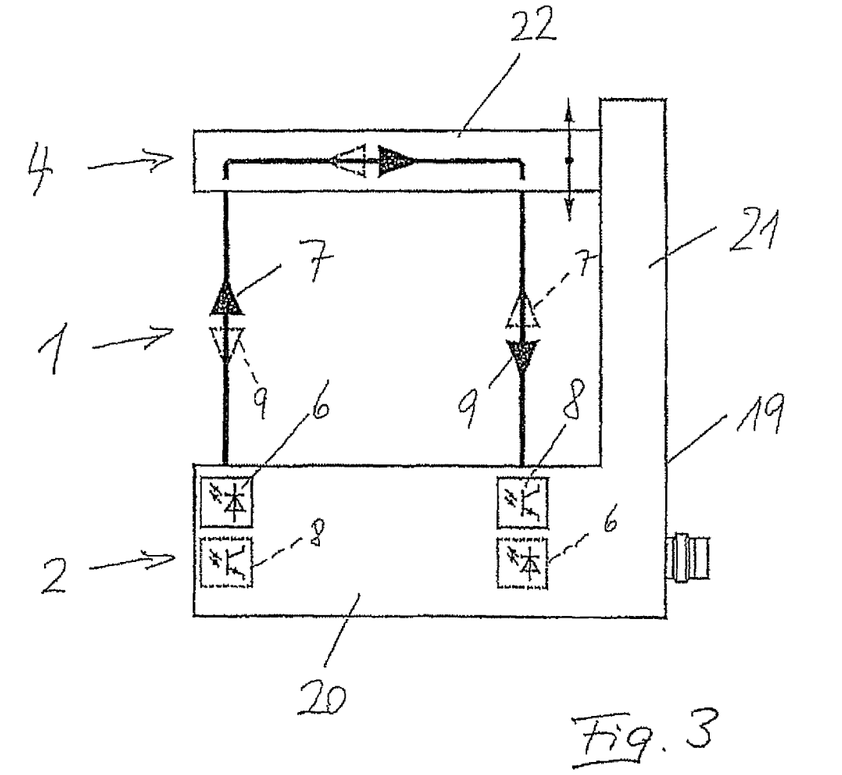
FIG. 3 is a schematic of a first embodiment of a fork light barrier.

In the case of the exemplary embodiment illustrated in FIG. 3, a light barrier is formed by a housing 19 that is of L-shaped design with two limbs 20, 21.

The first limb 20 includes the electronic components, while the second limb 21 carries in a displaceable fashion a housing part 22 in which the optical system 10 (not illustrated here) for deflecting the light beam is located.

It is indicated schematically in FIG. 3 that the transmitter 6 and receiver 8 are arranged in the first limb 20 so that the limb 20 forms the first side 2 of the light path 1 located between the first limb 20 and the housing part 22. The transmitter 6 emits the primary light beam 7 that is deflected in the housing part 22 and guided back to the receiver 8 as secondary light beam 9. For reasons of clarity, the evaluation and control stage 11 also present here is not depicted.

FIG. 3 indicates by elements, depicted with dashes, for the transmitter 6 and receiver 8, and for an appropriately inverted beam path with the primary light beam 7 and the secondary light beam 9 that the locations for the transmitter 6 and the receiver 8 can also be interchanged inside the first limb 20.

Figure 4:
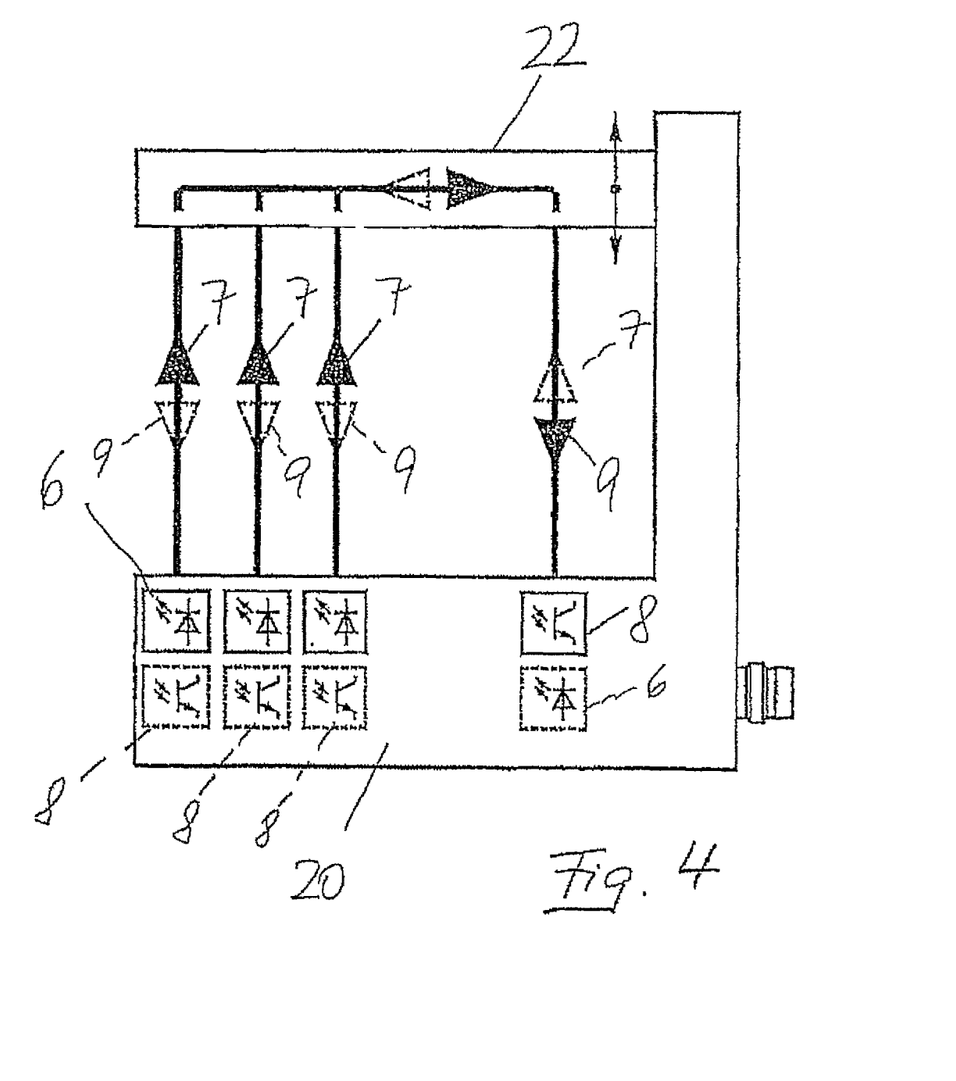
FIG. 4 is a schematic of a fork light barrier having one primary light beam and a plurality of secondary light beams, or a plurality of primary light beams and one secondary light beam.

Provided in the first limb 20 in the case of the exemplary embodiment illustrated in FIG. 4, whose mechanical design corresponds to that of the exemplary embodiment from FIG. 3, are three transmitters 6 which therefore emit three primary light beams 7. The three light beams are combined in the optical system in the housing part 22 and guided back to the receiver 8 as a secondary light beam 9, as is illustrated in FIG. 4 by continuous boxes.

The light barrier function can be carried out over a specific region with the aid of the three primary light beams, the illustrated design of a fork type light barrier having a housing part 22 whose distance from the first limb 20 is variable being advantageous. The evaluation of the secondary light beam 9 received by the receiver 8 can be performed by detecting the received intensity, indicating whether only one of the primary light beams 7, two of the primary light beams 7, or all three of the primary light beams 7 have been interrupted by an object within the fork light barrier. If it is also the aim in this case further to detect which of the three primary light beams has, as the case may be, been interrupted, it is possible to emit the three primary light beams 7 in multiplex form with the aid of the transmitters 6, the evaluation and control stage 11 (not illustrated) included in the first limb having information available as to which of the three primary light beams 7 has been emitted within a specific time window. The alternating frequency between the emitted primary light beam sections can in this case be so high that continuous primary light beams 7 are emitted in practice for the light barrier function, although the evaluation and control stage 11 can distinguish the three primary light beams 7 on the basis of the respective time window even when only one secondary light beam 9 is generated.

FIG. 4 shows with dashed boxes that here, as well, the reverse beam path is possible by having the transmitter 6 emit a primary light beam 7 that is split into three secondary and mutually parallel running light beams 9 in the optical system 10 (not illustrated) in the housing part 22. In this case, it is possible to provide in the first limb 20 of the housing 19 three receivers 8 that are respectively assigned one of the secondary light beams 9. It is primarily the secondary light beams 9 that serve here as measuring beams. However, the utilization of the primary light beam 7 as measuring light beam is also not excluded.

Figure 5:
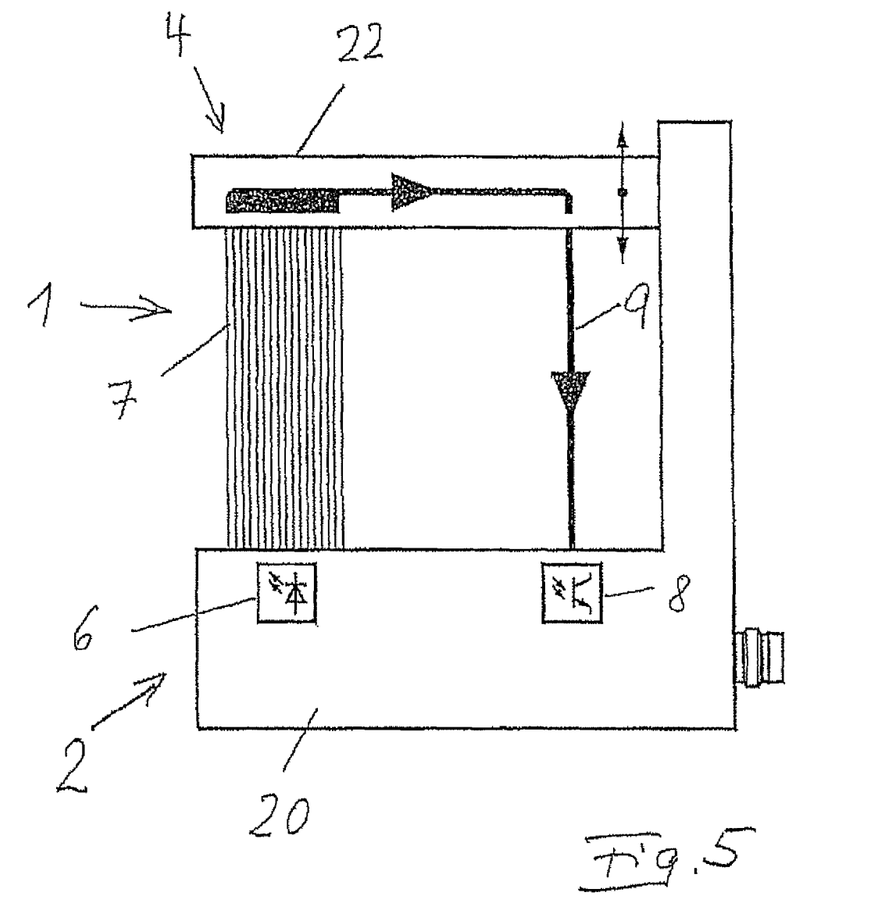
FIG. 5 is a schematic of a fork light barrier in accordance with FIG. 3 for the purpose of emitting an expanded primary light beam.

FIG. 5 shows an exemplary embodiment that corresponds to the exemplary embodiment illustrated with the aid of FIG. 3, the only point being that the primary light beam 7 emitted by the transmitter 6 is shaped into an expanded parallel light beam by a diverging optical system (not illustrated). In the housing part 22 on the second side 4, the expanded light beam 7 is recondensed by a focusing optical system into a narrow light beam and deflected in the housing part 22, in order to be guided back again to the receiver 8 on the first side 2 as a narrow secondary light beam 9. On being expanded, the primary light beam 7 covers a larger cross section of the light path 1. Through the use of an analog evaluation of the amplitude of the secondary light beam 9 received via the transmitter 8, it is possible in this case to establish the extent to which the expanded light beam 7 has, if appropriate, been interrupted by an object. It is possible hereby to reach conclusions on the size of the object interrupting the light beam 7, and on the position of the object between the limb and the housing part 22, as can follow from the respective application.

Figure 6:
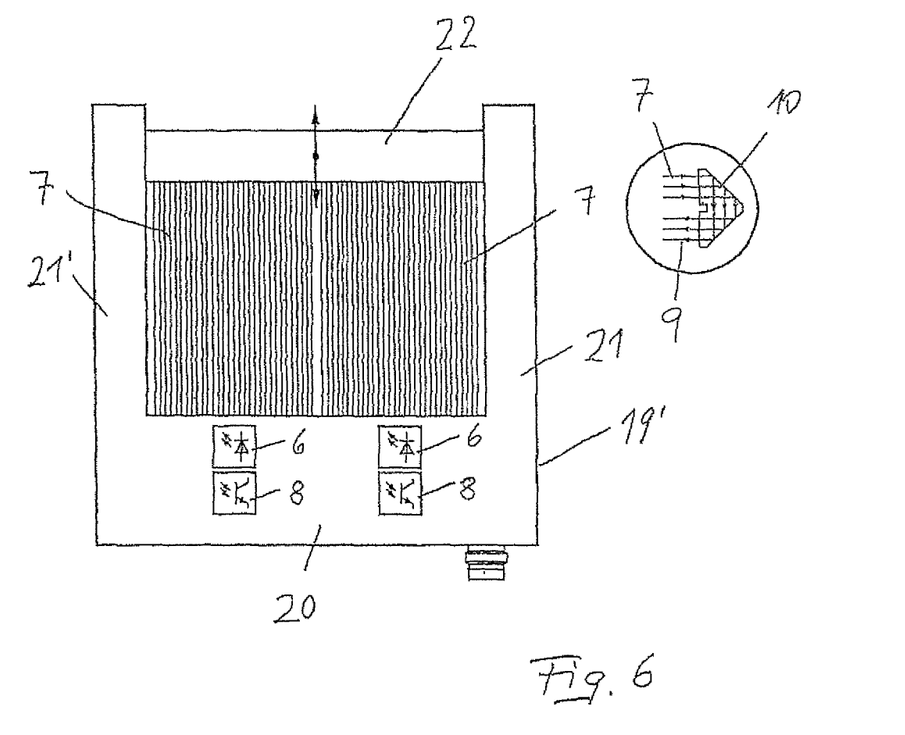
FIG. 6 shows an exemplary embodiment of a light barrier in a housing, in use with expanded light beams.

FIG. 6 illustrates an arrangement of a housing 19' that is provided with a further second limb 21' so that the housing part 22 is guided at both its ends into the second limbs 21, 21', while the electronic system of the light barrier is arranged in the first limb 20.

Provided in FIG. 6 are two transmitters 6, whose emitted light beam has been widened in two dimensions by a lens arrangement (not illustrated) so as to produce a two-dimensional light beam which extends in the plane of the drawing in FIG. 5. The deflecting optical system 10 that is present in the housing part 22 and illustrated separately in a schematic fashion in FIG. 6 is arranged so that in the illustration of FIG. 6 the incident primary light beam 7 is deflected downward, that is to say below the plane of the drawing, and is guided back as a secondary two-dimensional light beam 9 to the first limb 20, where the two secondary light beams 9 respectively strike a receiver 8, it being possible to cancel the expansion of the light beam 7, 9 by an appropriate focusing optical system.

The arrangement of FIG. 6 permits objects passing through the rectangular inner surface of the housing 19' to be detected, for example for counting purposes.

Figure 7:
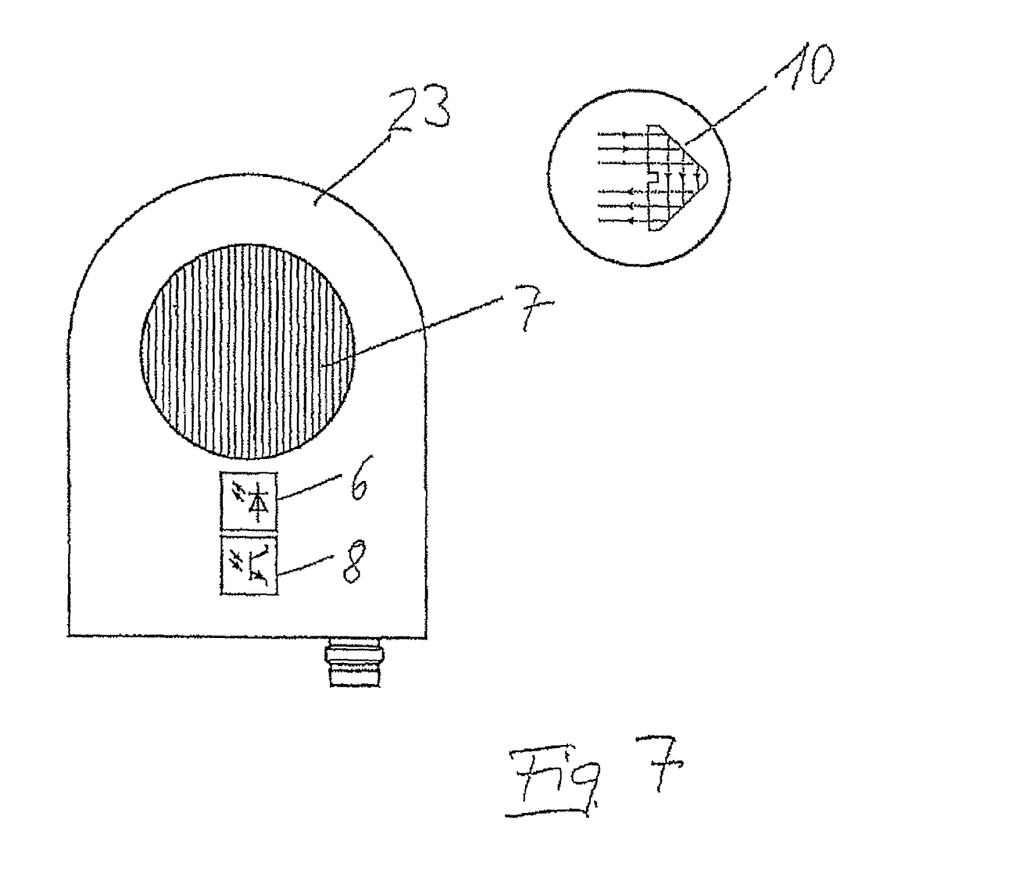
FIG. 7 shows another exemplary embodiment of a light barrier having an expanded light beam.

A similar arrangement results for an annular detector such as is illustrated in FIG. 7. The primary light beam 7 of a transmitter 6 is also expanded in two dimensions here, it being possible to detect in FIG. 7 only the portion of the primary light beam 7 that fills up the inner free space of an annular diaphragm 23. Provided at the end, opposite the transmitter 6, of the annular diaphragm 23 is the deflecting optical system 10 (illustrated separately in FIG. 7) which deflects the incident primary light beam 7 downward with the aid of a total reflection prism so that a corresponding two-dimensional secondary light beam 9 below the plane of the drawing in FIG. 7 is guided back onto the receiver 8 arranged under the transmitter 6. This light barrier also serves for counting all the objects that fall through the interior of the perforated diaphragm 23. It is clear that what matters here is not the material of the objects, and so—as opposed to conventional ring sensors—all the objects can be detected irrespective of their material.

Figure 8:
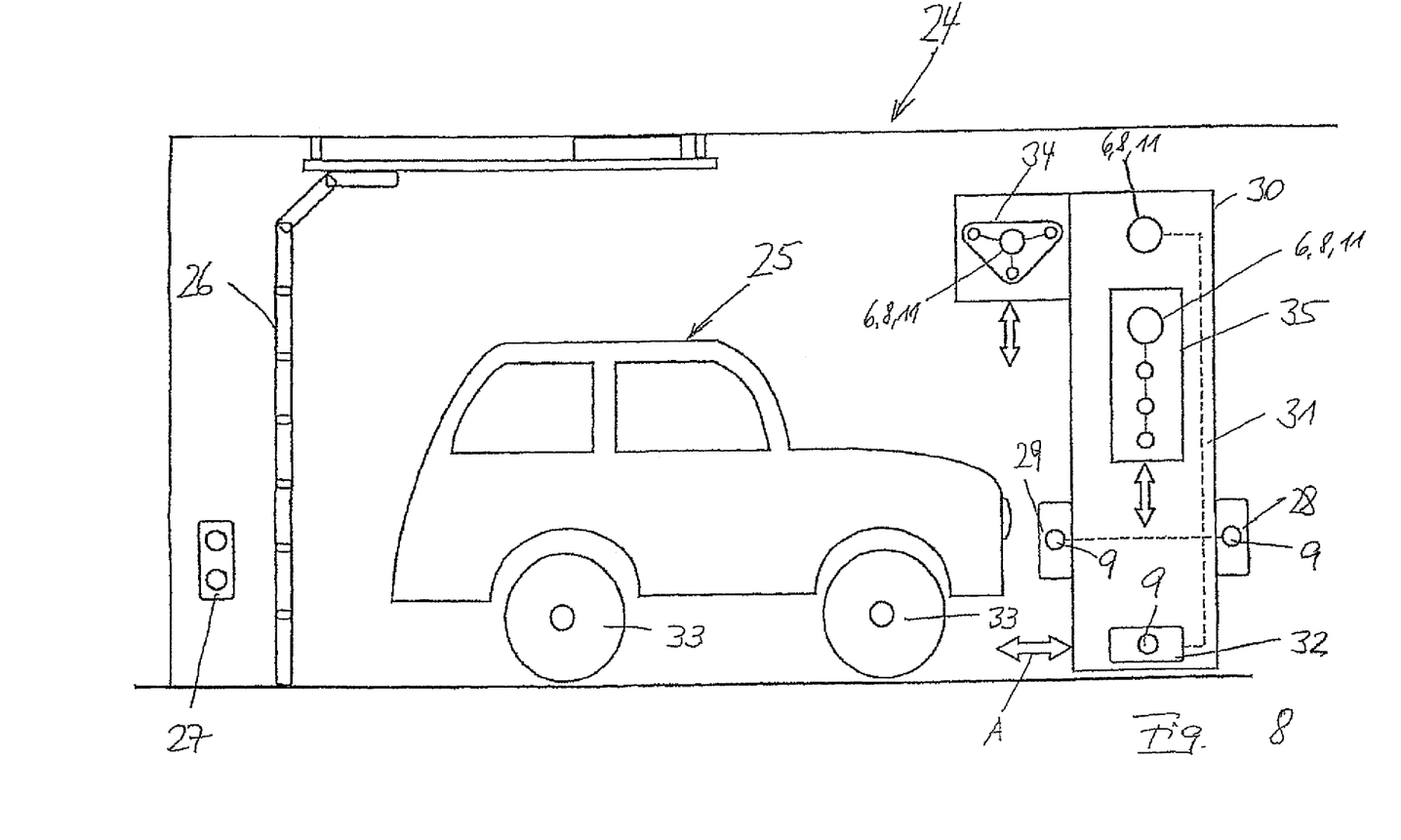
FIG. 8 is a schematic of the design of a car wash system having numerous light barriers.

FIG. 8 is a schematic of a car wash system 24 with a car 25 located therein. In order for the car 35 to be driven into the car wash system 24, a roller door 26 located at the entrance to the car wash system 24 is opened, specifically by means of a light barrier 27 with the aid of which the presence of a car 25 in front of the car wash system 24 is detected. The car 25 is positioned in the car wash system 24 with the aid of light barrier detectors 28, 29 that are located on a support frame 30 which can be moved on rails in the longitudinal direction of the car wash system 24, as indicated by a double arrow A. The support frame comprises two movable side pillars 31 planted on either side of the car 25 on rails, rollers or the like. At their lower end, the pillars 31 have a light barrier detector 32 for detecting the position of wheels 33 of the car 25.

The upper ends of the pillars 31 are interconnected by a cross beam (not illustrated) so that the support frame has the form of an inverted U. The cross beam is fitted so high that the support frame 30 can be moved alongside and over the top of cars 25 of a maximum permissible total height.

Whereas for the wash operation, for example with the aid of rotating brushes, the contour of the car 25 is scanned by measuring the pressure at the brush holders, contact with the car 25 is not desired for the subsequent drying. Consequently, the contour of the car 25 is scanned with the aid of light barrier detectors 34 or 35. The two light barrier detectors are arranged on the support frame 30 such that the height can be moved, so that they can, in particular, determine the upper contour of the car 25 when the support frame 30 is moved axially at the car 25 along the upper contour of the car 25 required for drying. This makes it plain that there is no need for the light barrier detectors 34 and 35 to be present at the same time in a car wash system 24, since one of the two light barrier detectors 34, 35 regularly suffices.

According to the invention, an advantageous utilization of the present invention is provided for the various light barrier detectors that are illustrated in FIG. 8.

In the view of FIG. 8, the first side may be located downstream of the car 25. Located on this side are the transmitter 6, receiver 8 and evaluation and control stage 11, which are indicated here schematically in a circle. A primary light beam is transmitted by means of the transmitter 6 to the second side, which lies in front of the car 25 in FIG. 8, it also being possible for this transmission to take place in the cross beam of the support frame 30 so that losses in intensity owing to air humidity, water droplets and the like can be avoided.

On the second side, the primary light beam is split by means of the optical system (not illustrated) into three secondary light beams 9 with the aid of which the light barrier detectors 28, 29 and 32 are formed. The secondary light beams 9 form the light barrier functions and reach the receivers 8 arranged on the first side via the light path 1 (not illustrated) running between the pillars 31.

The arrangement for the light barrier detector 34 and the light barrier detector 35 is provided in a corresponding way.

Figure 9:
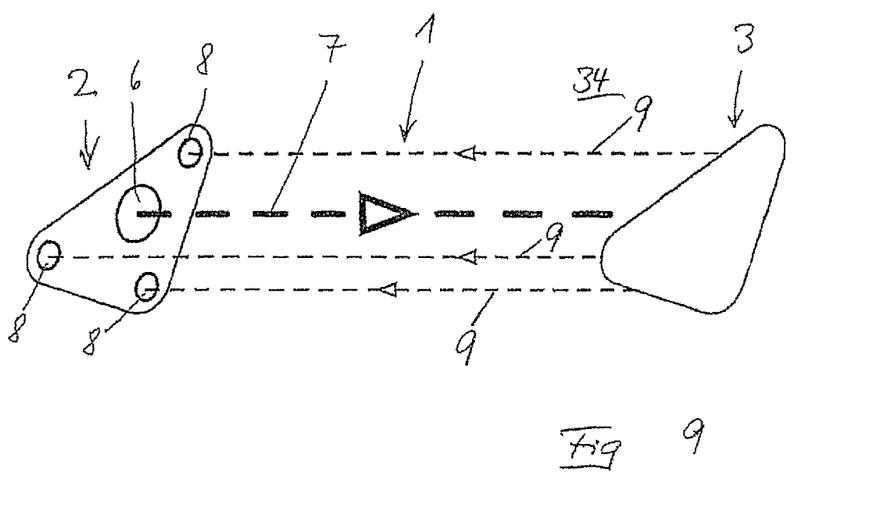
FIG. 9 is a schematic of the design of a light barrier for the purpose of scanning the contour of a motor vehicle in a car wash system.

FIG. 9 is a schematic of the design of the light barrier detector 34. On the first side 2 of the light path 1, which extends in FIG. 7 to the second side 3 from behind the car 25 to in front of the car, said light barrier detector has a transmitter 6 which emits a primary light beam 7 onto the second side 3. The primary light beam 7 is split into three secondary light beams 9, which are located at the three corners of a triangular housing, on the second side 3. The three secondary light beams 9 pass back to the first side 2 via the light path 1 and strike the receiver 8 there.

The three secondary light beams 9 preferably serve as measuring beams for the light barrier function, which is used here to scan the upper contour of the car 25.

Figure 10:
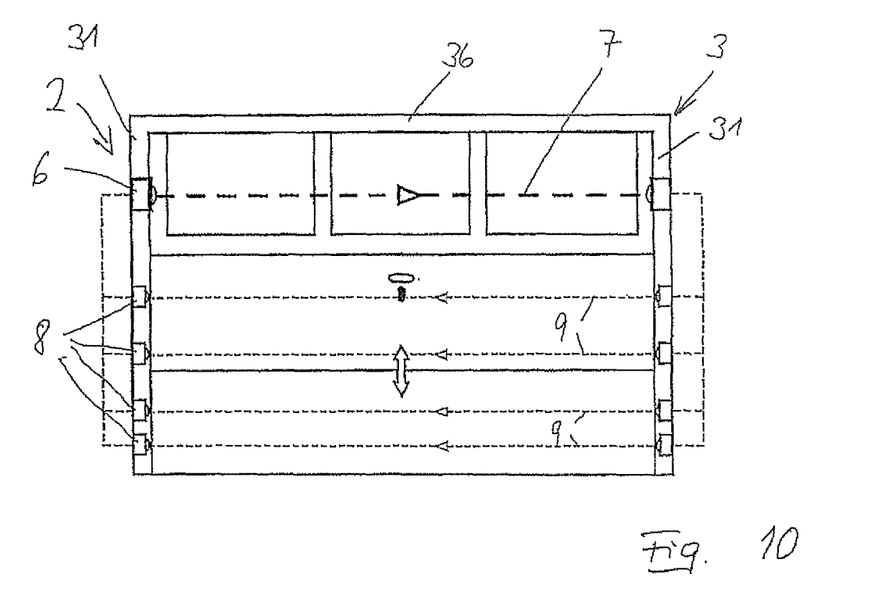
FIG. 10 is a schematic of the design of a light barrier arrangement for the purpose of detecting a vehicle position in a wash system.

FIG. 10 illustrates the arrangement of, for example, the light barrier detector 35, which can also be used to scan the contour of the car 25.

Located in the support 31 on the first side 2 are the transmitter 6 and receiver 8 with the associated optical systems. It is illustrated schematically that the primary light beam 7 emitted by the transmitter inside the cross beam 36 of the support frame 30 is deflected onto the second side 3 and split into four secondary light beams 9. The four secondary light beams 9 are received by receivers 8 on the first side 2 if the secondary light beams 9 have not been interrupted by the car 25. With the aid of the evaluation and control stage 11 (not illustrated) the determined contour is converted into a control signal for the drying nozzle guided at a distance over the upper contour of the car 25.

It is to be seen that owing to the undertaking to split the light beam into a plurality of secondary light beams 9 it is possible to use a single light barrier, that is to say a single evaluation and control stage 11, to fulfil a plurality of functions, since a plurality of measuring beams are available. There is the advantage in this case that the electronic system need be present only on the first side 2 so that no signal lines or electrical supply lines need be guided from the first side 2 to the second side 3, or vice versa.

Owing to the evaluation and control stage 11, it is possible in this case to control the intensity of the primary beam 7 emitted by the transmitter 6 on the first side 2 so that effectively evaluable secondary light beams 9 are always received by the receivers 8.

The invention claimed is:

1. A light barrier, comprising:
a housing;
a first and second limb connected to said housing wherein a spacing between said first limb and said second limb is variable, said first limb forming a first side of said light barrier and said second limb forming a second side of said light barrier, wherein said first side and said second side define a region to be monitored therebetween;
at least one transmitter;
at least one receiver, wherein said at least en one transmitter and said at least one receiver are located at said first side of said light barrier; and
an optical system located at said second side of said light barrier,
wherein at least one primary light beam is transmitted from said at least one transmitter to said optical system, and said optical system deflects said at least one primary light beam and returns at least one secondary light beam separate from the at least one primary light beam by a distance from the at least one primary light beam to said at least one receiver,
wherein the at least one primary light beam includes at least two primary light beams and the at least one secondary light beam includes only one secondary light beam, and
wherein the optical system is arranged for receiving said at least two primary light beams and for combining the at least two primary light beams to form said only one secondary light beam.

2. The light barrier as claimed in claim 1, wherein the optical system includes a focusing device for focusing the at least one secondary light beam.

3. The light barrier as claimed in claim 1, wherein the optical system includes an expanding device for expanding said at least one secondary light beam.

4. The light barrier as claimed in claim 1, further comprising a converging lens arrangement located upstream of the at least one receiver on the first side of the light barrier.

5. The light barrier as claimed in claim 1, wherein the at least one receiver is sensitive in two dimensions.

6. The light barrier as claimed in claim 1, wherein said region to be monitored is monitored using only the at least one secondary light beam.

7. The light barrier as claimed in claim 1, wherein said region to be monitored is monitored using only the at least one primary light beam.

8. The light barrier as claimed in claim 1, wherein said region to be monitored is monitored using both the at least one primary light beam and the at least one secondary light beam.

9. The light barrier as claimed in claim 1, wherein the at least one secondary light beam includes at least two secondary light beams, and wherein the optical system includes at least one beam splitter for forming said at least two secondary light beams spatially separated from one another.

10. The light barrier as claimed in claim 1, further comprising an evaluation and control stage on said first side of said light barrier for evaluating and controlling the intensity of the at least one primary beam emitted by the transmitter as a function of the intensity of the at least one secondary beam received by the at least one receiver.

11. The light barrier as claimed in claim 1, wherein the at least one secondary light beam includes a plurality of secondary light beams, and wherein the at least one receiver comprises a plurality of receiver elements, wherein each of said plurality of receiver elements is configured to receive one secondary light beam of said plurality of secondary light beams.

12. The light barrier as claimed in claim 1, further comprising:
- an expanding optical system associated with the at least one transmitter on the first side of said light barrier; and
- a converging optical system on the second side of said light barrier for condensing an expanded at least one primary light beam to a narrow light beam.

* * * * *